United States Patent
Chen (10) Patent No.: US 9,384,566 B2
(45) Date of Patent: Jul. 5, 2016

(54) SYSTEM AND METHOD FOR SIMULATANEOUS IMAGE ARTIFACT REDUCTION AND TOMOGRAPHIC RECONSTRUCTION

(71) Applicant: Wisconsin Alumni Research Foundation, Madison, WI (US)

(72) Inventor: Guang-Hong Chen, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 118 days.

(21) Appl. No.: 13/828,103

(22) Filed: Mar. 14, 2013

(65) Prior Publication Data

US 2014/0270439 A1    Sep. 18, 2014

(51) Int. Cl.
*G06K 9/00* (2006.01)
*G06T 11/00* (2006.01)

(52) U.S. Cl.
CPC .............. *G06T 11/003* (2013.01); *G06T 11/006* (2013.01); *G06T 2211/412* (2013.01); *G06T 2211/424* (2013.01)

(58) Field of Classification Search
None
See application file for complete search history.

(56) References Cited

U.S. PATENT DOCUMENTS

| | | | |
|---|---|---|---|
| 5,641,965 A * | 6/1997 | Barber et al. | 250/363.04 |
| 7,795,869 B1 * | 9/2010 | Bydder | 324/309 |
| 8,194,937 B2 | 6/2012 | Chen | |
| 8,229,199 B2 | 7/2012 | Chen et al. | |
| 8,374,413 B2 | 2/2013 | Chen | |
| 2003/0076988 A1 * | 4/2003 | Liang et al. | 382/131 |
| 2006/0074290 A1 * | 4/2006 | Chen et al. | 600/407 |
| 2009/0161932 A1 * | 6/2009 | Chen | 382/131 |
| 2009/0161933 A1 * | 6/2009 | Chen | 382/131 |
| 2011/0304745 A1 * | 12/2011 | Wang et al. | 348/229.1 |
| 2012/0099774 A1 * | 4/2012 | Akcakaya et al. | 382/131 |
| 2012/0243761 A1 * | 9/2012 | Senzig et al. | 382/131 |
| 2013/0182930 A1 * | 7/2013 | Trzasko et al. | 382/131 |
| 2013/0343624 A1 * | 12/2013 | Thibault et al. | 382/131 |
| 2013/0343625 A1 * | 12/2013 | Samsonov et al. | 382/131 |

OTHER PUBLICATIONS

"An algorithm for sparse MRI reconstruction by Schatten p-norm minimization," Angshul Majumdar, et al, Magnetic Resonance Imaging 29 (2011) 408-417.*
PCT International Search Report and Written Opinion, PCT/US2014/021581, Jun. 23, 2014, 10 pages.
Majumdar, A Sparsity Based Approach Towards Fast MRI Acquisition, Thesis, The University of British Columbia, Vancouver, Jul. 2012, 251 pages.

(Continued)

*Primary Examiner* — Wenpeng Chen
(74) *Attorney, Agent, or Firm* — Quarles & Brady, LLP (57) ABSTRACT

Described here is a system and method for image reconstruction that can automatically and iteratively produce multiple images from one set of acquired data, in which each of these multiple images corresponds to a subset of the acquired data that is self-consistent, but inconsistent with other subsets of the acquired data. The image reconstruction includes iteratively minimizing the rank of an image matrix whose columns each correspond to a different image. The rank minimization is constrained subject to a consistency condition that enforces consistency between the forward projection of each column in the image matrix and a respective subset of the acquired data that contains data that is consistent with data in the subset, but inconsistent with data not in the subset.

14 Claims, 6 Drawing Sheets

(56) References Cited

OTHER PUBLICATIONS

Majumdar, et al., Dynamic CT Reconstruction by Smoothed Rank Minimization, Radio Frequency Identification (Lecture Notes in Computer Science), K. Mori et al. (Eds.): MICCAI 2013, Part III, LNCS 8151, pp. 131-138.

Zhao, et al., Low Rank Matrix Recovery for Real-Time Cardiac MRI, IEEE International Symposium on Biomedical Imaging: From Nano to Macro, 2010, pp. 996-999.

* cited by examiner

SYSTEM AND METHOD FOR SIMULATANEOUS IMAGE ARTIFACT REDUCTION AND TOMOGRAPHIC RECONSTRUCTION

BACKGROUND OF THE INVENTION

The field of the invention is systems and methods for medical image reconstruction. More particularly, the invention relates to systems and method for simultaneously reducing image artifacts while reconstructing images from data obtained with a medical imaging system, such as an x-ray computed tomography system.

With conventional image reconstruction techniques, such as filtered backprojection for x-ray CT imaging and Fourier-based reconstructions techniques for MRI, a single image is reconstructed from a corresponding set of data acquired with the medical imaging system. For example, one image is reconstructed from a single sinogram in x-ray CT imaging and one image is reconstructed from one k-space data set in MRI. This correspondence between data and the images reconstructed from that data is because these traditional image reconstruction techniques are based on the assumption that all of the acquired data are consistent with each other. Routinely, however, data acquired with medical imaging systems are not consistent with a single true image of the subject being imaged, or a single state of a true image object that has dynamic characteristics.

These inconsistencies manifest as artifacts in the reconstructed images and can have many different origins. For example, in x-ray CT imaging, artifacts can result from the presence of metal objects in the subject, by acquiring too few projections, from beam-hardening effects, from x-ray scattering, subject motion, and so on. In MRI, artifacts can result from undersampling k-space, magnetic field inhomogeneities, subject motion, and so on. Inconsistencies between the acquired data and the stationary state of a true image of the subject can also have other sources, such as the presence of an exogenous contrast agent that if administered to the subject and the travels through the subject's vasculature. The assumption that the reconstructed image should be consistent with the acquired data is embodied in the following imaging model:

$$AI = Y \qquad (1);$$

which states that image reconstruction techniques should seek to reconstruct an image, I, that when forward projected is consistent with the acquired data, Y. The matrix, A, is referred to as the system matrix, which can be generally regarded as a forward projection operator that relates the reconstructed image, I, to the acquired data samples, Y. Eqn. (1) imposed that the reconstructed image, I, must be consistent with the measured data samples, Y; thus, Eqn. (1) can also be referred to as the "data consistency condition." In x-ray CT imaging, the system matrix can include a reprojection operation and in MRI the system matrix can include a Fourier transform operation. The consistency condition of Eqn. (1) put in other words, states that when an image is faithfully reconstructed, the forward projection of that image should be substantially similar to, or consistent with, the data actually acquired with the imaging system.

To reconstruct an image, I, from the measured data, Y, it is often required that the data satisfy the so-called data sufficiency condition, which is a condition that allows for an inverse reconstruction formula to be used to reconstruct the image from the measured data. In x-ray CT imaging, the data sufficiency condition is the so-called Tuy condition, which requires the data samples to be acquired in an extended angular range around the image object. In MRI, the data sufficiency condition is the complete population of the entire Fourier space. Even when the data sufficiency condition is satisfied, however, still another condition needs to be met to reconstruct a true image of the image object. The discretely acquired data samples also need to satisfy the associated sampling criterion for a given reconstruction scheme.

Examples of data sampling criteria include the view angle sampling requirement in x-ray CT and the Nyquist sampling criterion in MRI. When the data sampling criterion is met in x-ray CT, filtered backprojection can be used to reconstruct an image, and when the data sampling criterion is met in MRI, Fourier inversion can be used to reconstruct an image. When an iterative image reconstruction method is employed, the data sampling criteria are often significantly relaxed. One example of such a method is compressed sensing based iterative image reconstruction techniques.

In an ideal situation, when the aforementioned data sufficiency condition and data sampling conditions are satisfied, an artifact-free image can be reconstructed. This ideal situation is impractical in the real world, however, due to complications of data acquisition conditions and complications from the objects being imaged. As a result of these complications, the acquired data may not represent the same physical state of the image object, or may not be acquired under the same physical conditions. Thus, the acquired data are referred to as "inconsistent data." The physical reasons for these inconsistencies, whether because of a non-ideal acquisition system or because of a change in the physical state of the object during data acquisition, are referred to as the sources of inconsistency.

When the acquired data are no longer consistent due to sources of inconsistency, such as those described above, the consistency condition begins to break down. That is, the acquired data are no longer consistent when physical effects such as subject motion, contrast enhancement, noise, beam hardening in x-ray imaging, and so on are present during the data acquisition process. The inconsistencies in the acquired data manifest as artifacts in the reconstructed images.

It would therefore be desirable to provide systems and methods for reconstructing a medical image from data acquired from a medical imaging system that account for the level of inconsistencies in the acquired data, such that a faithful representation of the true image of an imaged subject can be produced.

SUMMARY OF THE INVENTION

The present invention overcomes the aforementioned drawbacks by providing systems and methods for image reconstruction that can automatically and iteratively produce multiple images from one set of acquired data, in which each of these multiple images corresponds to a different data consistency level. For instance, each image corresponds to a subset of the acquired data that is self-consistent, but inconsistent with other subsets of the acquired data. Because the degree of data consistency determines the level of artifacts in the reconstructed image, the present invention provides systems and methods for reconstructing images with different levels of artifacts and, thus, a target image with the lowest level of artifacts will be reconstructed simultaneously with an "artifact image" the depicts primarily artifacts.

It is an aspect of the invention to provide a method for reconstructing an image of a subject using a medical imaging system. The method includes acquiring data from the subject with the medical imaging system and initializing an image matrix having columns that each correspond to a different image. At least one image of the subject is then reconstructed from the acquired data acquired by minimizing a matrix rank of the image matrix. The rank minimization is constrained subject to a consistency condition that promotes the forward projection of each column in the image matrix to be consistent with a different subset of the acquired data. Each subset of the acquired data contains data that are consistent with each other while being inconsistent with data in other subsets of the acquired data.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

Described here are systems and methods for simultaneous image artifact reduction and tomographic image reconstruction, which may thus be referred to as a "SMART-RECON." The systems and methods are advantageously suited for medical imaging applications, such as time-resolved computed tomography ("CT"), cone-beam CT, cardiac imaging CT, contrast-enhanced CT, x-ray angiography, and magnetic resonance imaging ("MRI"). The systems and methods are also advantageously suited for artifact reduction where the artifacts are caused by sources including beam hardening, subject motion, spatial mismatch in the measured data, metallic implants in the subject, and excessive noise due to non-uniformity of the image objects.

In general, the image reconstruction operates by minimizing the rank of a generalized matrix that contains the target image and other images that are associated with acquired data that have different degrees of consistency. This method, and several examples of its implementation, are described below in detail.

With conventional image reconstruction techniques, such as filtered backprojection for x-ray CT imaging and Fourier-based reconstruction techniques for MRI, one image is reconstructed from one data set, despite the existence of data inconsistencies. For example, one image is reconstructed from a single sinogram in x-ray CT imaging and one image is reconstructed from one k-space data set in MRI. This correspondence between data and the images reconstructed from that data is because these traditional image reconstruction techniques are based on the assumption that all of the acquired data are consistent with each other and satisfy the sufficiency condition. By way of example, data acquired with an x-ray CT imaging system lose their consistency when the subject moves during data acquisition, when an exogenous contrast agent is administered to the subject, and when the x-ray beam is no longer monochromatic (e.g., when beam-hardening occurs). This assumption is embodied in the so-called forward imaging model, or "consistency condition,"

$$AI=Y \qquad (2);$$

which states that image reconstruction techniques should seek to reconstruct an image, I, that when forward projected is consistent with the acquired data, Y. The matrix, A, is referred to as the system matrix, which can be generally regarded as a forward projection operator that relates the reconstructed image, I, to the acquired data samples, Y. In x-ray CT imaging, the system matrix can include a reprojection operation and in MRI the system matrix can include a Fourier transform operation. The consistency condition of Eqn. (2), put in other words, states that when an image is faithfully reconstructed, the forward projection of that image should be substantially similar to, or consistent with, the data actually acquired with the imaging system.

Conventional image reconstruction methods, such as filtered backprojection for x-ray CT, Fourier inversion for MRI, and iterative reconstruction from all acquired data, there is no intrinsic mechanism that accounts for the degree of data consistency or inconsistency. The single indication of data inconsistency is the appearance of image artifacts in the reconstructed image. To reduce the artifact levels, the acquired data can be preprocessed with the appropriate technique for the type of artifacts present in the image. It is unknown, however, to what extent the acquired data should be corrected before image reconstruction.

It is noted that tomographic reconstructions, such as filtered backprojection, have a certain level of tolerance to data inconsistencies. For example, data inconsistency may not necessarily result in image artifacts in the reconstructed image, but the threshold for this tolerance to inconsistencies cannot be known a priori. Thus, it remains highly desirable to develop systems and methods that can automatically account for data inconsistencies during the image reconstruction process.

The acquired data are no longer consistent when physical effects such as subject motion, contrast enhancement, noise, beam hardening in x-ray imaging, and so on are present during the data acquisition process. These inconsistencies in the acquired data manifest as artifacts in the reconstructed images.

To address this problem, the present invention provides systems and methods for image reconstruction that account for intrinsic data consistency in acquired data, which allows for images to be separately reconstructed with different artifact levels that depend on the inconsistency level of the acquired data. In many cases, an image with minimal artifacts will be reconstructed from those consistent data samples, together with an image that primarily depicts artifacts from other data with higher levels of inconsistency in the acquired data.

This concept can be interpreted as seeking to reconstruct the maximally available generalized image matrix, X, from the acquired data. If the acquired set of data samples has $N_S$ data samples, the worst case scenario is that all of the data samples are inconsistent with one another. In this case, $N_S$ images would be required to delineate the physical state of the image object. As a result, the maximally available generalized image matrix, X, would have $N_S$ columns. The number of rows in the maximally available generalized image matrix, X, would be the total number of image pixels for a two-dimensional image, or the total number of image voxels for a three-dimensional image volume. By lowering the rank of this generalized image matrix while constrained by the data consistency condition of Eqn. (2), the images with different artifact levels can be reconstructed by automatically grouping consistent data into a series of images that reflects the consistency level among the data.

The connection between data consistency and image matrix rank reduction can be understood as follows. When the acquired data are all consistent (e.g., from each view angle in x-ray CT imaging or with respect to each line in k-space in MRI), all columns in the maximally available generalized image matrix, X, will be the same. Mathematically, this generalized image matrix, X, thus has a column rank of one, or Rank(X)=1. When the acquired data can be divided into two consistency classes in some way, then the rank of the maximally available generalized image matrix, X, will increase to two, or Rank(X)=2. In this instance, the rank of the maximally available generalized image matrix can be reduced to two. In other words, the rank reduced generalized image matrix, X, contains only two columns, $$X=[X_1 X_2] \quad (3);$$

where each column corresponds to an image reconstructed from the data in the associated consistency class.

The increase in rank is because the acquired data contains two distinct groups of data that are each internally consistent, but inconsistent with each other. An example of this is when data is acquired from a subject who moves during data acquisition. The data acquired when the subject was not moving will not be consistent with the data acquired when the subject was moving. On the other hand, the data acquired when the subject was not moving will be internally consistent, as will the data acquired when the subject was moving. This property is exploited by the present invention to reconstruct an image that is free of the contributions from the inconsistent data. As will be described below, there can be more than two consistency classes in the acquired data and each of these consistency classes can be separated from each other.

In general, an image that is free of the contributions from inconsistent data can be obtained by minimizing the rank of the maximally available generalized image matrix, X, such that the forward projection of the desired column of the maximally available generalized image matrix, $X_n = I_n$, is consistent with the associated consistency class in the acquired data, $Y_n$. That is, $$\underset{X}{\mathrm{argmin}} \ \{\mathrm{Rank}(X)\} \text{ such that } AI_n = Y. \quad (4)$$

The rank minimization described by Eqn. (4) automatically and iteratively groups consistent data from different sources into several irreducible image columns in X. It is noted that the individual image, $I_n$, corresponds to a different consistency class and is a column vector in the generalized image matrix, X. That is, $$X=[I_1 \ldots I_N] \quad (5).$$

Here, the individual image, $I_n$, corresponding to a particular consistency class is formed by applying a vecotrization operation to an ordinary image with two indices, $$I_n=\mathrm{vec}(I_n(x,y)) \quad (6);$$

or with three indices, $$I_n=\mathrm{vec}(I_n(x,y,z)) \quad (7).$$

Numerically, it is an NP-hard problem to solve the rank minimization problem because it is equivalent to solving a zero-norm minimization problem. This point can be illustrated by introducing a singular value decomposition ("SVD") operation to the generalized image matrix, X, as follows:

$$X=U\Sigma V \quad (8);$$

where the U and V matrices are orthogonal and the $\Sigma$ matrix is a diagonal matrix with r non-zero elements, referred to as the singular values, $\sigma_i$, of the matrix, $$\Sigma=\mathrm{diag}\{\sigma_1,\sigma_2,\ldots,\sigma_r,0,0,\ldots,0\} \quad (9).$$

As long as this SVD is performed, the rank of the generalized image matrix, X, is said to be r. Thus, minimization of the rank of the generalized image matrix, X, can be equated to minimizing the following zero-norm:

$$\underset{X}{\mathrm{argmin}} \ \{\mathrm{Rank}(X)\} \equiv \underset{X}{\mathrm{argmin}} \ \|X\|_0; \quad (10)$$

where $\|X\|_0$ is the zero-norm of the generalized image matrix, X, which is equal to the number of non-zero diagonal elements in the singular value decomposition of the generalized image matrix, X. The zero-norm problem in Eqn. (10) can be practically relaxed to an $l_1$-norm, as is often done in compressed sensing. Namely, instead of directly solving the problem in Eqn. (4), the problem is relaxed to the following convex optimization problem:

$$\underset{X}{\mathrm{argmin}} \ \|X\|_*; \quad (11)$$

where $\|X\|^*$ is the so-called nuclear norm of the generalized image matrix, X, which can be given by, $$\|X\|_* = \sum_{i=1}^{r} |\sigma_i| = \sum_{i=1}^{r} |\sum_{ii}|. \quad (12)$$

More generally, the more general Schatten p-norm can be used to relax the precise rank minimization in Eqn. (4). The Schatten p-norm is defined as, $$\|X\|_p^p = \sum_i \sigma_i^p. \quad (13)$$

Using the Schatten p-norm, the rank minization in Eqn. (4) can be relaxed as the following convex optimization problem for $p \geq 1$:

$$\underset{X}{\operatorname{argmin}} \ \|X\|_p^p \text{ such that } AI_n = Y. \quad (14)$$

The constrained optimization problem in Eqn. (14) can be solved by minimizing the following objective function with a quadratic penalty:

$$\underset{X}{\operatorname{argmin}} \ \left\{\frac{1}{2}\|AI_n - Y\|_D^2 + \lambda\|X\|_p^p\right\}; \quad (15)$$

where the weighted norm for a generalized input is given as, $$\|Z\|_D^2 = Z^T D \quad (16);$$

with the diagonal matrix, D, given by, $$D = \operatorname{diag}\left\{\frac{1}{\xi_1^2}, \frac{1}{\xi_2^2}, \ldots \right\}; \quad (17)$$

where $\xi_i^2$ is the noise variance for the $i^{th}$ measured data sample. Therefore, the diagonal matrix, D, accounts for noise in the measured data samples by assigning a lower weight to higher noise data and a higher weight to lower noise data. The parameter, $\lambda$, is used to tradeoff the data fidelity term and the relaxed matrix rank minimization term in Eqn. (15). The equivalence of the constrained optimization problem in Eqn. (14) and the unconstrained optimization problem in Eqn. (15) can be reached in the limit of $\lambda = \infty$. Additionally, the constrained optimization problem in Eqn. (14) can be solved using the well-known augmented Lagrangian multiplier method.

In Eqn. (15), rank minimization can be viewed as a regularization to the noise-penalized least square minimization. In addition to the above rank regularization, other additional regularization methods can also be added to Eqn. (15). One example of additional regularization methods includes the prior image constrained compressed sensing ("PICCS") objective function, which is described in U.S. Pat. Nos. 8,194, 937; 8,229,199; and 8,374,413, which are each herein incorporated by reference in their entirety. By incorporating the PICCS objective function, Eqn. (15) can be generalized as, $$\underset{X}{\operatorname{argmin}} \ \left\{\frac{\lambda}{2}\|AI_n - Y\|_D^2 + \|X\|_p^p + \alpha\|\Psi_1 I_n\|_q^q + (1-\alpha)\|\Psi_2(I_n - I_p)\|_q^q\right\}; \quad (18)$$

where $\Psi_1$ and $\Psi_2$ are sparsifying transforms, which promote sparsity in each individual image component, $I_n$; $I_P$ is a prior image in the PICCS reconstruction; the parameter, $\alpha$, is used to assign a weight to the term without the prior image contribution and to the term with the prior image contribution; and the q-norm of a vector, Z, is defined as, $$\|Z\|_q^q = \sum_{j=1}^N |Z_j|^q. \quad (19)$$

When a blind SVD operation is applied to the generalized image matrix, X, it can be computationally expensive. In practice, it is contemplated that the target rank of the generalized image matrix will generally be low; thus, a truncated SVD decomposition can be used in a numerical implementation. As one example, the lowest rank approximation can be used, in which Rank(X)=1. In this case, all of the acquired data samples are used to reconstruct a single image. The conventional numerically efficient methods for solving such a problem is an image reconstruction technique such as filtered backprojection for x-ray CT data or Fourier inversion for k-space data acquired with an MRI system. This first pass estimation can be used as the initial guess for the first column of the generalized image matrix, X. The rank minimization process can then iteratively proceed to rank two, rank three, an upwards to the desired rank r solution. In practice, it is contemplated that $r \leq 20$ will be sufficient for most clinical imaging applications. In this case, the acquired data are sorted into r different consistency classes. Using the first column as the prior image, $I_P$, the PICCS algorithm can be used to reconstruct the r columns of the generalized image matrix, X. Having obtained these initial solutions, the generalized image matrix, X, can be decomposed into the following form:

$$X = [\ I_1 \quad I_2 \quad \ldots \quad I_{N-1} \quad I_N\ ] \quad (20)$$

$$= U^{MN \times r} \sum^{r \times r} V^{r \times MN}.$$

Here, the initially estimated r column images fill in the r columns in the U matrix. One of the optimization problems in Eqns. (4), (11), (14), (15), or (18) can be solved to iteratively determine the diagonal matrix, $\Sigma$, and also the V matrix. Furthermore, if the multiplication of the diagonal matrix, $\Sigma$, and the V matrix is treated as a single matrix, $$\tilde{V}^{r \times MN} = \Sigma V \quad (21);$$

then the optimization problem in Eqns. (4), (11), (14), (15), or (18) can then be solved iteratively to determine the matrix, $\tilde{V}$.

When the above decomposition of the generalized image matrix, X, is performed such that the image matrix, X, is decomposed into the following matrix multiplication:

$$X = UV \quad (22);$$

sparsity constraints and other regularizations can be directly applied to the two matrix components, U and V. As a result, the following variation in the optimization problem can be provided.

$$\underset{X}{\operatorname{argmin}} \ \left\{\frac{1}{2}\|AI_n - Y\|_D^2 + \lambda_1\|\Psi_1 U\|_1 + \lambda_2\|\Psi_2 V\|_1\right\}. \quad (23)$$

When the above described procedure to compute the U matrix is used, the second term in Eqn. (23), $\lambda_1\|\Psi_1 U\|$, can be set to zero to improve numerical efficiency.

For instance, in an x-ray CT imaging application, the rank minimization will automatically and iteratively group consistent data from different view angles into several irreducible image columns. The numerical value of the final rank of the generalized image matrix, X, is the number of distinct images that are reconstructed from the acquired data. Each of these distinct images corresponds to a different subset of the acquired data that is internally consistent.

Classification of data consistency classes will depend on the particular imaging application. In an x-ray CT application, data samples acquired at each given x-ray source position often represents a consistency class when dynamic CT imaging is performed. Examples of dynamic CT imaging includes cardiac CT imaging in diagnostic multislice CT; contrast-enhanced CT imaging, with or without organ motion involved; time-resolved cone-beam CT in image-guided radiation therapy; an time-resolved cone-beam CT using a C-arm based cone-beam CT system in image-guided interventions.

When multi-energy CT acquisitions are employed, the consistency classification will be dependent on the x-ray spectrum. Thus, for dual energy CT acquisitions, it is natural to classify the data and images into two consistency classed corresponding to the two energy levels utilized in the imaging procedure.

When a conventional single spectrum CT data acquisition is used, the data and images can be classified into two or more classes that are determined by the x-ray path lengths and image content. When highly attenuating objects, such as bony structures or exogenous metallic objects, are present in the subject, the measured data points passing though these highly attenuating objects and those measured data that do not pass through these highly attenuating objects can be classified into different consistency classes.

For an MRI system that is used to generate dynamic imaging, such as cardiac MRI or time-resolved contrast-enhanced MRI, the data consistency and corresponding image classes can be sorted based on prior knowledge of the cardiac and/or respiratory phase.

The higher the rank of the maximally available generalized image matrix, X, the more consistency classes that will be sought in the acquired data. That is to say, as the rank of the maximally available generalized image matrix, X, increases, the inconsistencies in the acquired data will be spread to more images. Depending on the imaging application, this feature can be advantageously relied upon to separate a general class of inconsistency into smaller subsets. For example, motion artifacts can be parsed into motions occurring at different speeds. In this manner, slower motion artifacts (e.g., respiratory motion) can be separated from faster motion artifacts (e.g., cardiac motion).

The rank minimization can also be combined with other minimization constraints to further improve image quality. For instance, the minimization presented in Eqn. (4) can be additionally constrained subject to conditions or optimization requirements. One example of an additional constraint is a prior image constrained compressed sensing ("PICCS") constraint, such as the ones described in U.S. Pat. Nos. 8,194, 937; 8,229,199; and 8,374,413, which are each herein incorporated by reference in their entirety. Alternatively, other compressed sensing constraints could be imposed while minimizing the rank of the maximally available image matrix.

Advantageously, minimizing the rank of the maximally available image matrix in this manner allows for the separation of unwanted components of an image from the desirable components. In some instances, the unwanted components can then be used to further correct the desirable components or to ascertain additional information about the subject. Several applications of this method will now be described.

Figure 1:
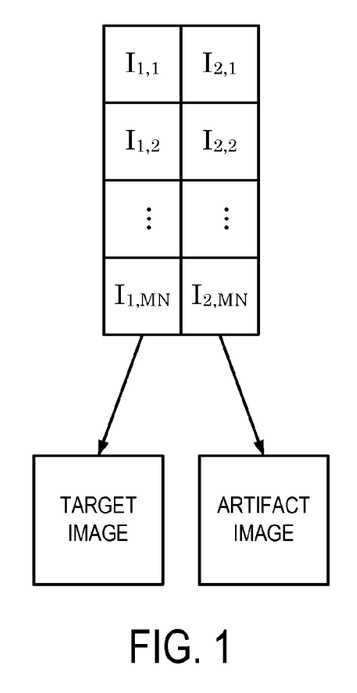
FIG. 1 illustrates an example of a rank-minimized image matrix having columns associated with a target image of a subject and an artifact image.

With reference now to FIG. 1, the method of the present invention can be used to produce a rank R=2 maximally available image matrix, X, having two columns corresponding to two consistency classes of the acquired data. The first column contains the target image, in which substantially no image artifacts are present. The second column contains an artifact image that depicts the inconsistencies in the acquired data, which are generally regarded as image artifacts. For instance, this artifact image can include contributions associated with streak artifacts, aliasing artifacts, scatter artifacts, beam hardening artifacts, motion artifacts, and so on. As one example, when metal artifacts and beam hardening corrupt CT images, the method of the present invention is capable of searching for a target image with minimal metal and beam hardening artifacts while also optionally returning other images that depict primarily only the respective artifacts.

Figure 2:
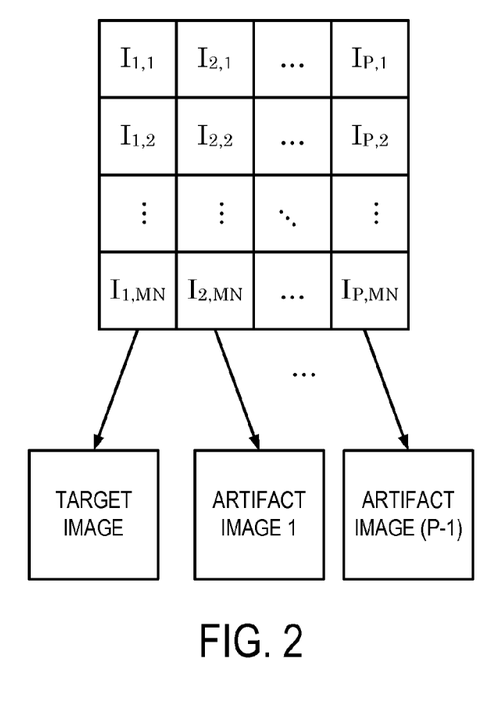
FIG. 2 illustrates an example of a rank-minimized image matrix having columns associated with a target image of a subject and multiple different artifact images.
Figure 3:
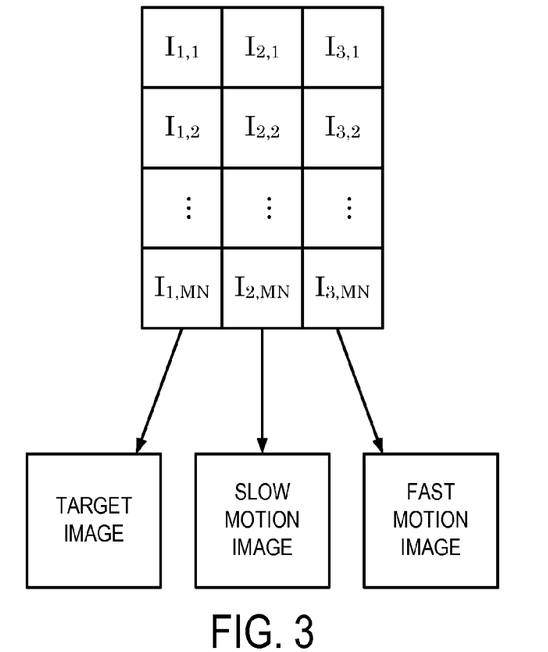
FIG. 3 illustrates an example of a rank-minimized image matrix having columns associated with a target image of a subject, an image associated with fast motion occurring within the subject during data acquisition, and an image associated with slower motion occurring within the subject during data acquisition.

As illustrated in FIG. 2, the method of the present invention can also be used to further separate an artifact image into multiple different artifact images by selecting the appropriate rank at which to conclude the rank minimization of the maximally available image matrix. For instance, the method of the present invention can be used to separate different artifacts into different images, such as one image for streak artifacts and another image for beam-hardening artifacts. This result is attainable because one type of image artifact (e.g., aliasing) will be inconsistent relative to another type of image artifact (e.g., beam-hardening). As such, the different artifact types will generally belong to different consistency classes that will be separated by the method of the present invention. Separating the artifacts into different artifact images is advantageous when information about the specific artifact sources can provide additional information As illustrated in FIG. 3, the method of the present invention can also be used to separate static and moving portions of an image or time series of images. Not only can the static and moving portions be separated, but the moving portions can be divided into two or more images depicting regions of the image field-of-view ("FOV") that are moving at different speeds. In this manner, regions of the image FOV that affected by different motion sources can be separated out. For instance, motion associated with respiration can be separated from cardiac motion or the motion of a tumor. As a result, respiratory or cardiac gating can be achieved without the need for additional processing or motion information acquisition.

Figure 4:
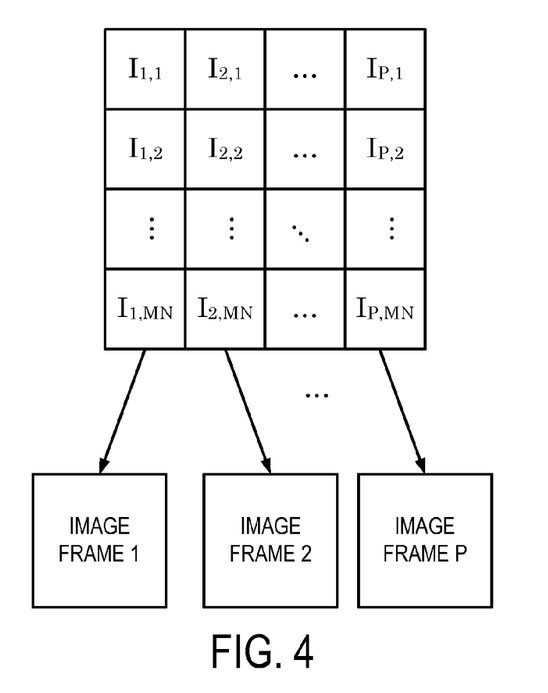
FIG. 4 illustrates an example of a rank-minimized image matrix having columns associated with different time frames obtained during a dynamic imaging acquisition, each of the different time frames corresponding to a different set of self-consistent data.

As illustrated in FIG. 4, the method of the present invention is also capable of reconstructing a series of image frames, such as a series of images depicting a vasculature during a time-resolved angiographic or perfusion imaging procedure, a subject's heart during a cardiac imaging procedure, a subject's respiration, and so on. In these instances, the method of the present invention is able to recover a set of consistent images of the subject acquired during the course of data acquisition. As one example, in cardiac imaging applications, the method of the present invention can be used to produce motion consistent images for each cardiac phase because the data acquired at a given phase of the cardiac cycle will be largely consistent with other data acquired at the same cardiac phase, whereas data acquired at different cardiac phases will be largely inconsistent. The method of the present invention can also be implemented in contrast-enhanced imaging applications to generate several consistent time frames from one short scan data acquisition.

Figure 5:
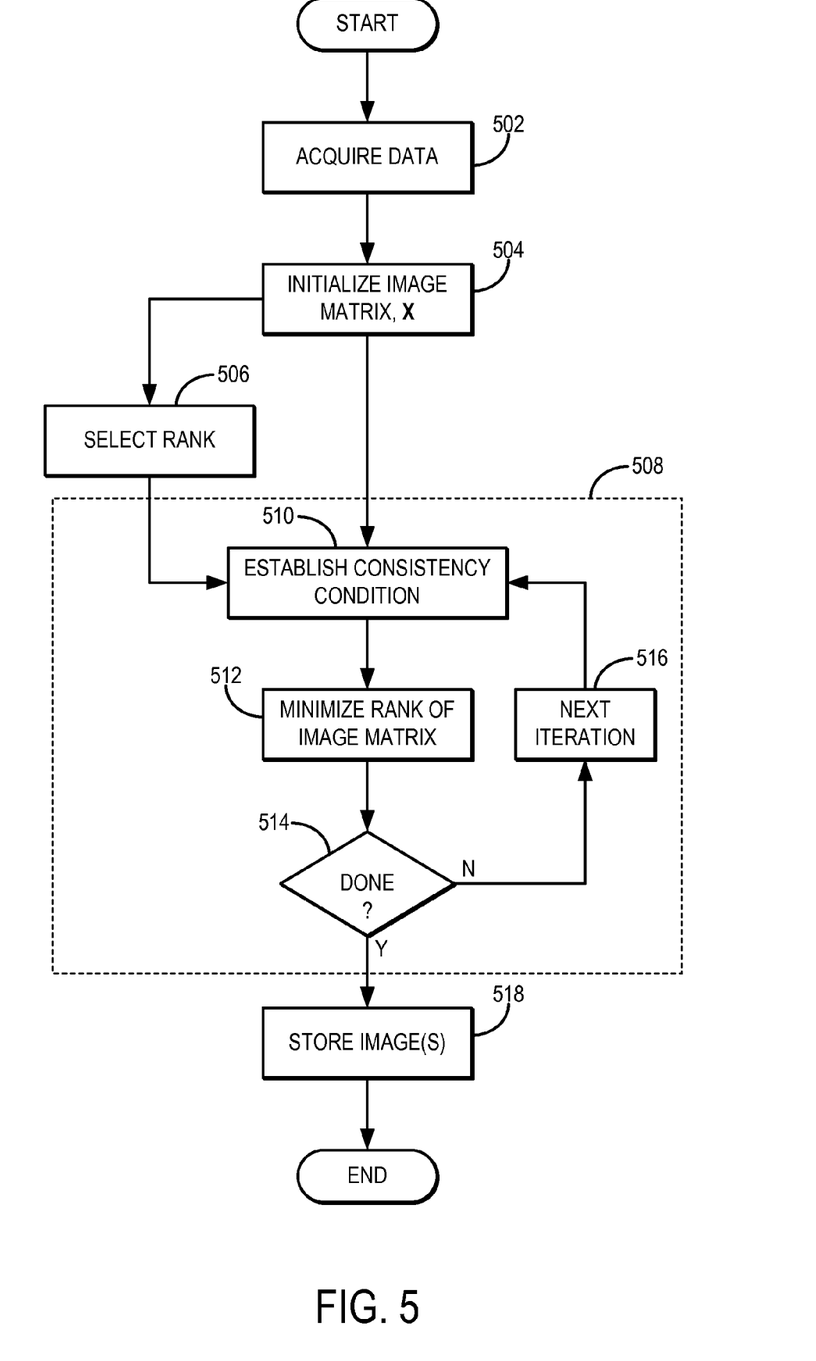
FIG. 5 is a flowchart of an example of a method for producing an image of a subject from acquired data using rank minimization to separate consistent subsets of the acquired data.

Referring now to FIG. 5, a flowchart setting forth the steps of an example of a method for producing an image of a subject from acquired data using rank minimization to separate consistent subsets of the acquired data is illustrated. The method begins with the acquisition of data using a medical imaging system, as indicated at step 502. The data acquisition can be performed with any suitable medical imaging system, including an x-ray computed tomography system, an x-ray tomosynthesis system, and x-ray C-arm system, a magnetic resonance imaging system, an ultrasound system, a positron emission tomography system, and so on. The acquired data generally will include inconsistencies resulting from one or more different sources. Examples of these different sources of inconsistencies include aliasing caused by undersampling, noise, x-ray beam-hardening, metal artifacts in x-ray imaging, subject motion occurring during data acquisition, and so on.

After data have been acquired, the image reconstruction process generally begins. First, an image matrix having column that will be associated with different images is initialized, as indicated at step 504, and as described above. Optionally, a desired rank to which the image matrix should be minimized is selected, as indicated at step 506. As discussed above, the choice of image matrix rank can be determined using a singular value decomposition of the image matrix. As indicated generally at 508, a target image of the subject is then reconstructed using an iterative rank minimization process that is subject to a consistency condition constraint in which each column of the image matrix is required to be consistent with a unique subset of the acquired data that is to some extent inconsistent with the rest of the acquired data. That is, each column of the reconstructed image matrix will correspond to an image representative of a unique subset of the acquired data. Each of these subsets of the acquired data contain data that are consistent with each other, but at the same time, each subset of the acquired data contain data that are generally inconsistent with data not included in the subset. As such, the image reconstruction process is capable of automatically separating the acquired data into different subsets of data that each correspond to a unique consistency class. By minimizing the rank of the image matrix, the fewest possible number of such consistency classes is sought. As noted above, however, the desired image matrix rank can also be selected to force the separation of the acquired data into a predefined number of consistency classes.

The reconstruction of the image matrix thus includes establishing the aforementioned consistency condition between the columns of the image matrix and subsets of the acquired data, as indicated at step 510. The rank of the image matrix is then minimized, as indicated at step 512. This process is iteratively repeated until a stopping criterion is met, as determined at decision block 514. Examples of stopping criterion include when a target rank, which may be optionally selected as described above, is achieved, and when the difference of the estimated values in two consecutive iterations is smaller than a predetermined threshold value. If the stopping criterion is not met, the next iteration of the minimization begins, as indicated at step 516. When the stopping criterion is met, however, the images contained in the columns of the image matrix are individually stored, as indicated at step 518.

Figure 6A:
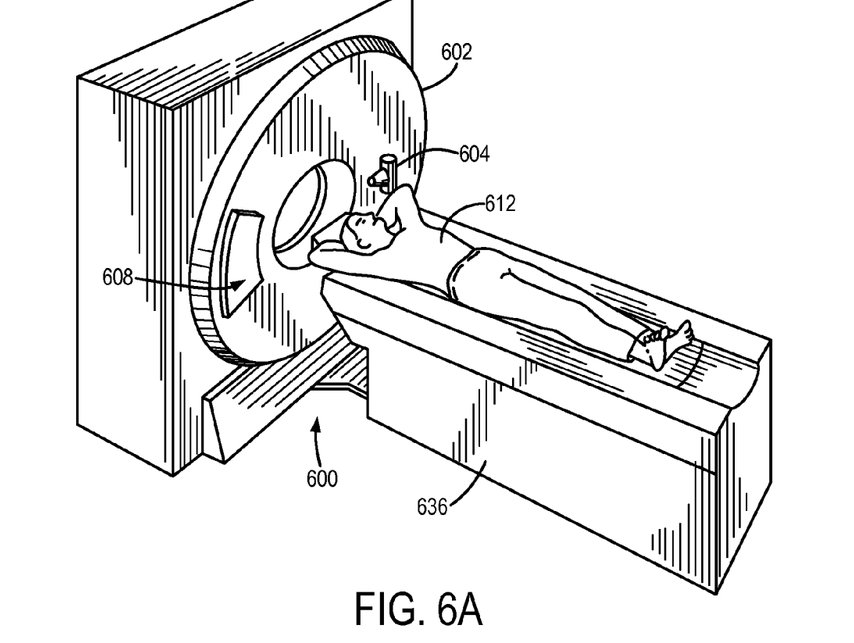
FIG. 6A is an illustration of an example of an x-ray computed tomography system.
Figure 6B:
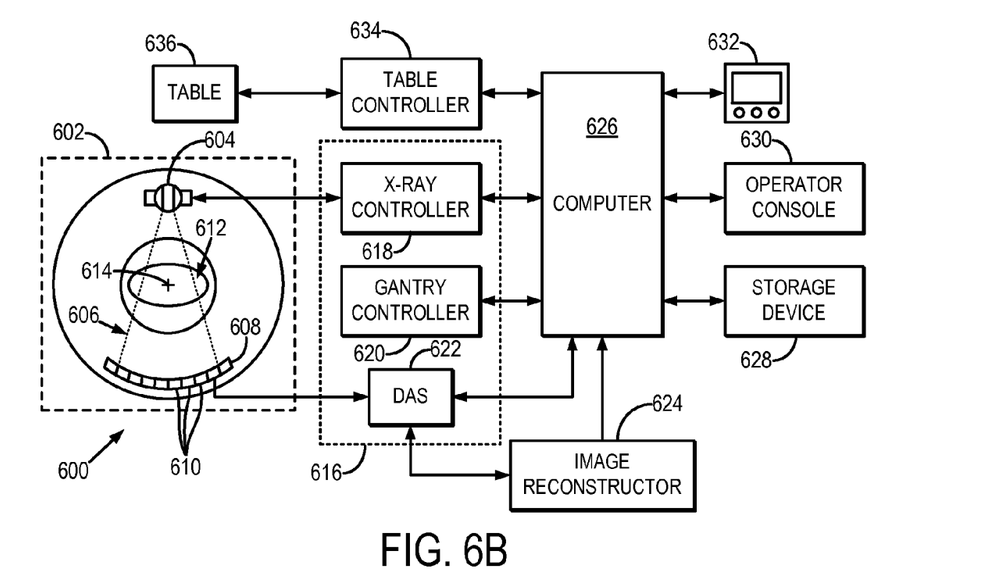
FIG. 6B is a block diagram of the x-ray CT system of FIG. 6A.

With initial reference to FIGS. 6A and 6B, an x-ray computed tomography ("CT") imaging system 600 that may be used when practicing the present invention includes a gantry 602. The gantry 602 has an x-ray source 604 that projects a fan-beam, or cone-beam, of x-rays 606 toward a detector array 608 on the opposite side of the gantry 602. The detector array 608 is formed by a number of detector elements 610, which together sense the projected x-rays 606 that pass through a subject 612, such as a medical patient or an object undergoing examination. Each detector element 610 produces an electrical signal that represents the intensity of an impinging x-ray beam and, hence, the attenuation of the beam as it passes through the subject 612. During a scan to acquire x-ray projection data, the gantry 602 and the components mounted thereon rotate about a center of rotation 614 located within the subject 612.

The rotation of the gantry 602 and the operation of the x-ray source 604 are governed by a control mechanism 616 of the CT system 600. The control mechanism 616 includes an x-ray controller 618 that provides power and timing signals to the x-ray source 604, and a gantry controller 620 that controls the rotational speed and position of the gantry 602. A data acquisition system ("DAS") 622 in the control mechanism 616 samples data from the detector elements 610 and converts the data to digital signals for subsequent processing. An image reconstructor 624, receives sampled and digitized x-ray data from the DAS 622 and performs image reconstruction thereon. The reconstructed image is applied as an input to a computer 626 which stores the image in a storage device 628, such as a mass storage device.

The computer 626 also receives commands and scanning parameters from an operator via a console 630 that has a keyboard. An associated display 632 allows the operator to observe the reconstructed image and other data from the computer 626. The operator supplied commands and parameters are used by the computer 626 to provide control signals and information to the DAS 622, the x-ray controller 618, and the gantry controller 620. In addition, computer 626 operates a table controller 634 that controls a table 636 to position the subject 612 in the gantry 602.

Figure 7A:
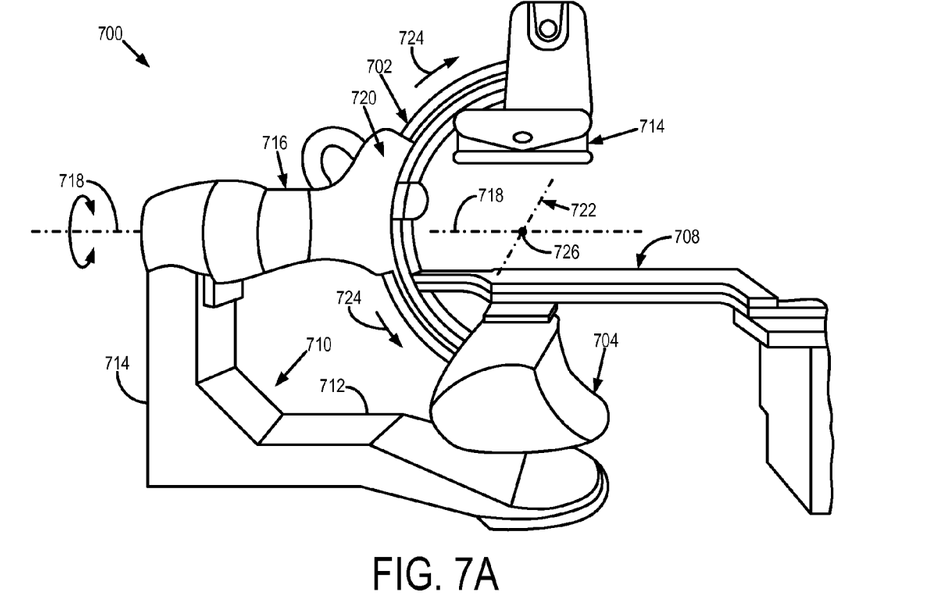
FIG. 7A is an illustration of an example of a C-arm x-ray imaging system.
Figure 7B:
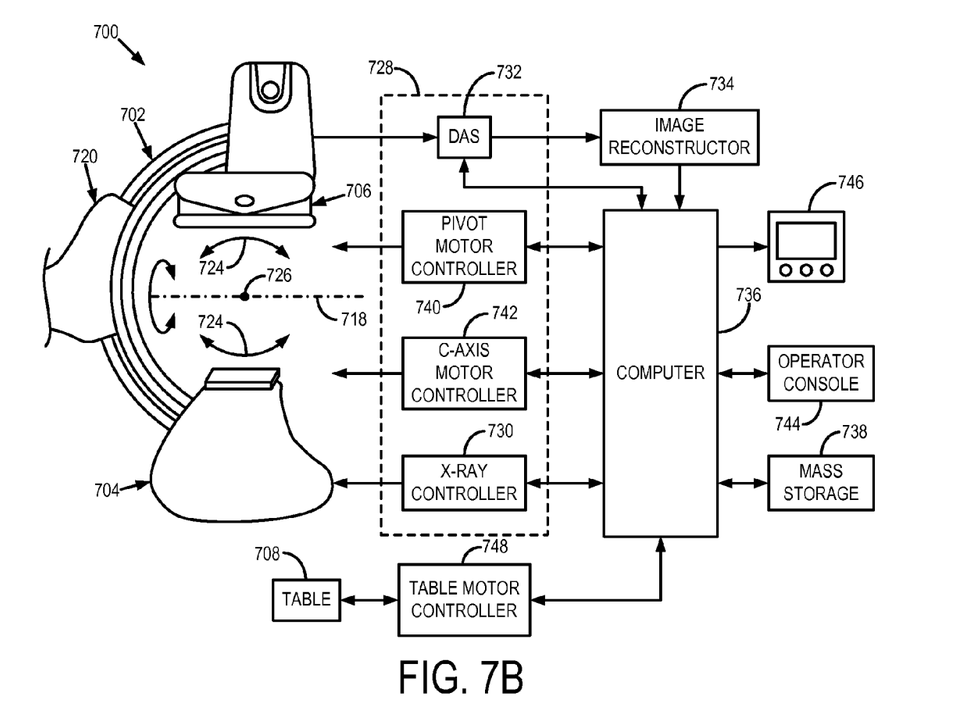
FIG. 7B is a block diagram of the C-arm x-ray imaging system of FIG. 7A.

Referring particularly to FIGS. 7A and 7B, an example of a so-called "C-arm" x-ray imaging system 700 is illustrated. Such an imaging system 700 is generally designed for use in connection with interventional procedures. The imaging system 700 is characterized by a gantry having a C-arm 702 that carries an x-ray source assembly 702 on one of its ends and an x-ray detector array assembly 706 at its other end. The gantry enables the x-ray source assembly 703 and detector array assembly 706 to be oriented in different positions and angles around a patient disposed on a table 708, while enabling a physician access to the patient.

The gantry includes a support base 710, which may include an L-shaped pedestal that has a horizontal leg 712 that extends beneath the table 708 and a vertical leg 714 that extends upward at the end of the horizontal leg 712 that is spaced from of the table 708. A support arm 716 is rotatably fastened to the upper end of vertical leg 714 for rotation about a horizontal pivot axis 718. The pivot axis 718 is aligned with the centerline of the table 708 and the support arm 716 extends radially outward from the pivot axis 718 to support a C-arm drive assembly 720 on its outer end. The C-arm 702 is slidably fastened to the drive assembly 720 and is coupled to a drive motor (not shown) that slides the C-arm 702 to revolve it about a C-axis 722, as indicated by arrows 724. The pivot axis 718 and C-axis 722 intersect each other at an isocenter 726 that is located above the table 708 and they are perpendicular to each other.

The x-ray source assembly 704 is mounted to one end of the C-arm 702 and the detector array assembly 706 is mounted to its other end. As will be discussed in more detail below, the x-ray source assembly 704 includes an x-ray source (not shown) that emits a cone beam of x-rays, which are directed at the detector array assembly 706. Both assemblies 704 and 706 extend radially inward to the pivot axis 718 such that the center ray of this cone beam passes through the system isocenter 726. The center ray of the cone beam can, thus, be rotated about the system isocenter 726 around either the pivot axis 718, the C-axis 722, or both during the acquisition of x-ray attenuation data from a subject placed on the table 708.

As mentioned above, the x-ray source assembly 704 contains an x-ray source that emits a cone beam of x-rays when energized. The center ray passes through the system isocenter 726 and impinges on a two-dimensional flat panel digital detector housed in the detector assembly 706. Examples of flat panel detectors include so-called "small flat panel" detectors, in which the detector array panel is around 20×20 centimeters in size. Such a detector panel allows the coverage of a field-of-view of around twelve centimeters. Each detector element produces an electrical signal that represents the intensity of an impinging x-ray and, hence, the attenuation of the x-ray as it passes through the patient. During a scan, the x-ray source and detector array are rotated about the system isocenter 726 to acquire x-ray attenuation projection data from different angles. By way of example, the detector array is able to acquire thirty projections, or views, per second. Generally, the numbers of projections acquired per second is the limiting factor that determines how many views can be acquired for a prescribed scan path and speed.

Referring particularly to FIG. 7B, the rotation of the assemblies 704 and 706 and the operation of the x-ray source are governed by a control mechanism 728 of the imaging system 700. The control mechanism 728 includes an x-ray controller 730 that provides power and timing signals to the x-ray source. A data acquisition system ("DAS") 732 in the control mechanism 728 samples data from detector elements in the detector array and passes the data to an image reconstructor 734. The image reconstructor 734, receives digitized x-ray data from the DAS 732 and performs image reconstruction. The image reconstructed by the image reconstructor 734 is applied as an input to a computer 736, which stores the image in a mass storage device 738 or processes the image further.

The control mechanism 728 also includes pivot motor controller 740 and a C-axis motor controller 742. In response to motion commands from the computer 736, the motor controllers 740 and 742 provide power to motors in the imaging system 700 that produce the rotations about the pivot axis 718 and C-axis 722, respectively. A program executed by the computer 736 generates motion commands to the motor controllers 740 and 742 to move the assemblies 704 and 706 in a prescribed scan path.

The computer 736 also receives commands and scanning parameters from an operator via a console 744 that has a keyboard and other manually operable controls. An associated display 746 allows the operator to observe the reconstructed image and other data from the computer 736. The operator supplied commands are used by the computer 736 under the direction of stored programs to provide control signals and information to the DAS 732, the x-ray controller 730, and the motor controllers 740 and 742. In addition, the computer 736 operates a table motor controller 748, which controls the patient table 708 to position the patient with respect to the system isocenter 726.

Figure 8:
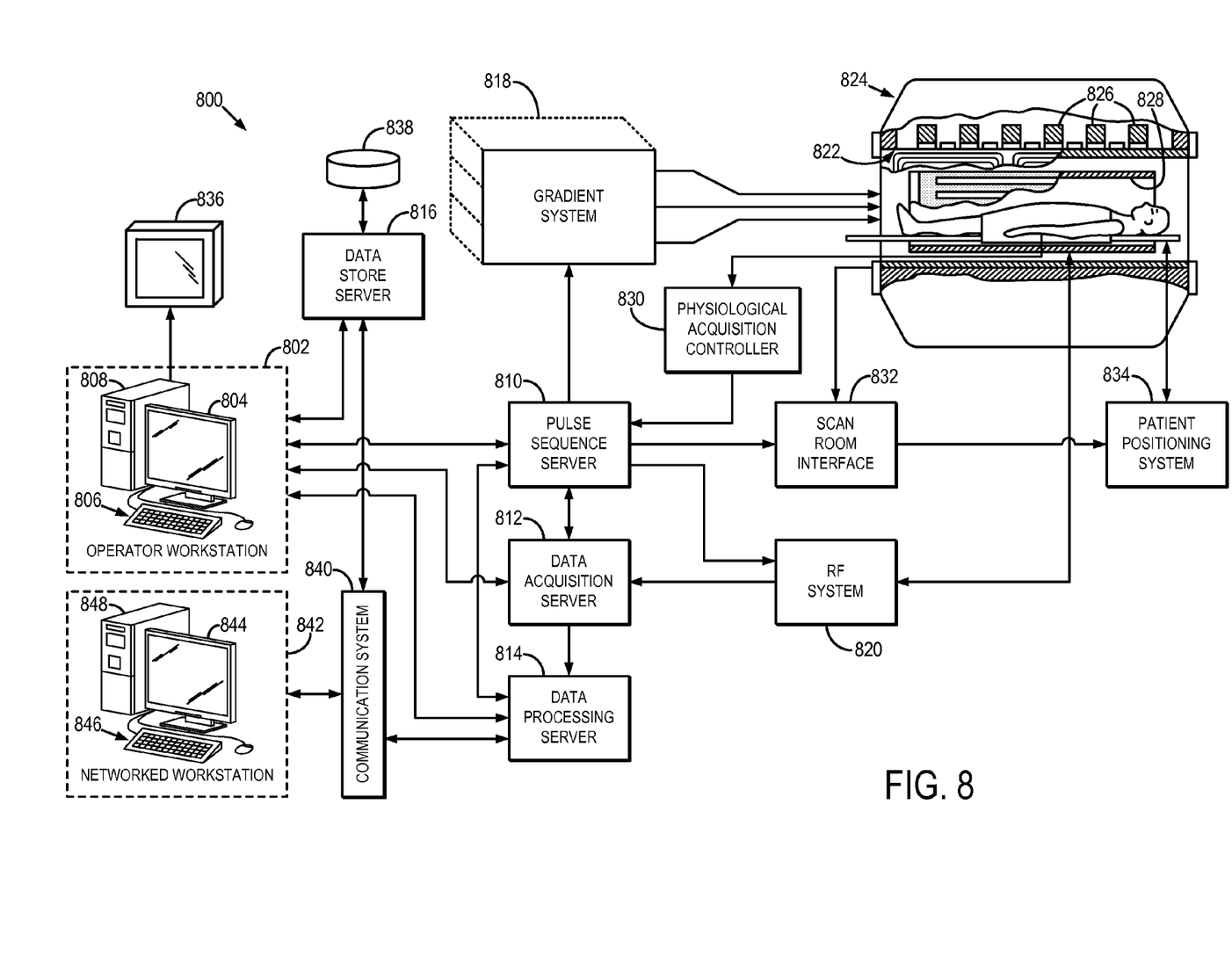
FIG. 8 is a block diagram of an example of a magnetic resonance imaging system.

Referring particularly now to FIG. 8, an example of a magnetic resonance imaging ("MRI") system 800 is illustrated. The MRI system 800 includes an operator workstation 802, which will typically include a display 804; one or more input devices 806, such as a keyboard and mouse; and a processor 808. The processor 808 may include a commercially available programmable machine running a commercially available operating system. The operator workstation 802 provides the operator interface that enables scan prescriptions to be entered into the MRI system 800. In general, the operator workstation 802 may be coupled to four servers: a pulse sequence server 810; a data acquisition server 812; a data processing server 814; and a data store server 816. The operator workstation 802 and each server 810, 812, 814, and 816 are connected to communicate with each other. For example, the servers 810, 812, 814, and 816 may be connected via a communication system 840, which may include any suitable network connection, whether wired, wireless, or a combination of both. As an example, the communication system 840 may include both proprietary or dedicated networks, as well as open networks, such as the internet.

The pulse sequence server 810 functions in response to instructions downloaded from the operator workstation 802 to operate a gradient system 818 and a radiofrequency ("RF") system 820. Gradient waveforms necessary to perform the prescribed scan are produced and applied to the gradient system 818, which excites gradient coils in an assembly 822 to produce the magnetic field gradients $G_x$, $G_y$, and $G_z$ used for position encoding magnetic resonance signals. The gradient coil assembly 822 forms part of a magnet assembly 824 that includes a polarizing magnet 826 and a whole-body RF coil 828.

RF waveforms are applied by the RF system 820 to the RF coil 828, or a separate local coil (not shown in FIG. 8), in order to perform the prescribed magnetic resonance pulse sequence. Responsive magnetic resonance signals detected by the RF coil 828, or a separate local coil (not shown in FIG. 8), are received by the RF system 820, where they are amplified, demodulated, filtered, and digitized under direction of commands produced by the pulse sequence server 810. The RF system 820 includes an RF transmitter for producing a wide variety of RF pulses used in MRI pulse sequences. The RF transmitter is responsive to the scan prescription and direction from the pulse sequence server 810 to produce RF pulses of the desired frequency, phase, and pulse amplitude waveform. The generated RF pulses may be applied to the whole-body RF coil 828 or to one or more local coils or coil arrays (not shown in FIG. 8).

The RF system 820 also includes one or more RF receiver channels. Each RF receiver channel includes an RF preamplifier that amplifies the magnetic resonance signal received by the coil 828 to which it is connected, and a detector that detects and digitizes the I and Q quadrature components of the received magnetic resonance signal. The magnitude of the received magnetic resonance signal may, therefore, be determined at any sampled point by the square root of the sum of the squares of the I and Q components:

$$M=\sqrt{I^2+Q^2} \tag{24};$$

and the phase of the received magnetic resonance signal may also be determined according to the following relationship:

$$\varphi = \tan^{-1}\left(\frac{Q}{I}\right). \tag{25}$$

The pulse sequence server 810 also optionally receives patient data from a physiological acquisition controller 830. By way of example, the physiological acquisition controller 830 may receive signals from a number of different sensors connected to the patient, such as electrocardiograph ("ECG") signals from electrodes, or respiratory signals from a respiratory bellows or other respiratory monitoring device. Such signals are typically used by the pulse sequence server 810 to synchronize, or "gate," the performance of the scan with the subject's heart beat or respiration.

The pulse sequence server 810 also connects to a scan room interface circuit 832 that receives signals from various sensors associated with the condition of the patient and the magnet system. It is also through the scan room interface circuit 832 that a patient positioning system 834 receives commands to move the patient to desired positions during the scan.

The digitized magnetic resonance signal samples produced by the RF system 820 are received by the data acquisition server 812. The data acquisition server 812 operates in response to instructions downloaded from the operator workstation 802 to receive the real-time magnetic resonance data and provide buffer storage, such that no data is lost by data overrun. In some scans, the data acquisition server 812 does little more than pass the acquired magnetic resonance data to the data processor server 814. However, in scans that require information derived from acquired magnetic resonance data to control the further performance of the scan, the data acquisition server 812 is programmed to produce such information and convey it to the pulse sequence server 810. For example, during prescans, magnetic resonance data is acquired and used to calibrate the pulse sequence performed by the pulse sequence server 810. As another example, navigator signals may be acquired and used to adjust the operating parameters of the RF system 820 or the gradient system 818, or to control the view order in which k-space is sampled. In still another example, the data acquisition server 812 may also be employed to process magnetic resonance signals used to detect the arrival of a contrast agent in a magnetic resonance angiography ("MRA") scan. By way of example, the data acquisition server 812 acquires magnetic resonance data and processes it in real-time to produce information that is used to control the scan.

The data processing server 814 receives magnetic resonance data from the data acquisition server 812 and processes it in accordance with instructions downloaded from the operator workstation 802. Such processing may, for example, include one or more of the following: reconstructing two-dimensional or three-dimensional images by performing a Fourier transformation of raw k-space data; performing other image reconstruction algorithms, such as iterative or back-projection reconstruction algorithms; applying filters to raw k-space data or to reconstructed images; generating functional magnetic resonance images; calculating motion or flow images; and so on.

Images reconstructed by the data processing server 814 are conveyed back to the operator workstation 802 where they are stored. Real-time images are stored in a data base memory cache (not shown in FIG. 8), from which they may be output to operator display 812 or a display 836 that is located near the magnet assembly 824 for use by attending physicians. Batch mode images or selected real time images are stored in a host database on disc storage 838. When such images have been reconstructed and transferred to storage, the data processing server 814 notifies the data store server 816 on the operator workstation 802. The operator workstation 802 may be used by an operator to archive the images, produce films, or send the images via a network to other facilities.

The MRI system 800 may also include one or more networked workstations 842. By way of example, a networked workstation 842 may include a display 844; one or more input devices 846, such as a keyboard and mouse; and a processor 848. The networked workstation 842 may be located within the same facility as the operator workstation 802, or in a different facility, such as a different healthcare institution or clinic.

The networked workstation 842, whether within the same facility or in a different facility as the operator workstation 802, may gain remote access to the data processing server 814 or data store server 816 via the communication system 840. Accordingly, multiple networked workstations 842 may have access to the data processing server 814 and the data store server 816. In this manner, magnetic resonance data, reconstructed images, or other data may exchanged between the data processing server 814 or the data store server 816 and the networked workstations 842, such that the data or images may be remotely processed by a networked workstation 842. This data may be exchanged in any suitable format, such as in accordance with the transmission control protocol ("TCP"), the internet protocol ("IP"), or other known or suitable protocols.

The present invention has been described in terms of one or more preferred embodiments, and it should be appreciated that many equivalents, alternatives, variations, and modifications, aside from those expressly stated, are possible and within the scope of the invention.

The invention claimed is:

1. A method for reconstructing an image using a medical imaging system, the steps of the method comprising:
   a) acquiring data from a subject with the imaging system;
   b) initializing an image matrix having columns that each corresponds to a different image;
   c) reconstructing at least one image of the subject from the data acquired in step a) by:
      i) performing a rank minimization to minimize a matrix rank of the image matrix; and
      ii) constraining the rank minimization of step c)i) subject to a consistency condition that promotes a forward projection of each column in the image matrix to be consistent with a different subset of the acquired data;
   wherein each subset of the acquired data contains data that are consistent only with other data in that subset of the acquired data and are otherwise inconsistent with data in other subsets of the acquired data.

2. The method as recited in claim 1 in which the data acquired in step a) includes inconsistencies and step c) includes reconstructing a target image of the subject that is substantially free of image artifacts and at least one artifact image that contains substantially only image artifacts associated with the inconsistencies.

3. The method as recited in claim 1 in which the data acquired in step a) is representative of a time series of images and step c) includes reconstructing the time series of images, wherein each column in the image matrix corresponds to one of the images in the time series.

4. The method as recited in claim 3 in which the time series of images depict different cardiac phases of a subject's heart and each subset of the acquired data corresponds to data acquired during a given cardiac phase.

5. The method as recited in claim 1 in which the data acquired in step a) includes inconsistencies associated with motion of the subject that occurred while the data was acquired.

6. The method as recited in claim 5 in which step c) includes reconstructing an image of the subject that is substantially free of motion-related image artifacts and at least one image that depicts motion artifacts associated with the inconsistencies in the data acquired in step a).

7. The method as recited in claim 6 in which the at least one image that depicts motion artifacts comprises a first image that depicts motion artifacts related to subject motion occurring in a first range of speeds and a second image that depicts motion artifacts related to subject motion occurring in a second range of speeds that is different than the first range of speeds.

8. The method as recited in claim 1 in which the medical imaging system is at least one of an x-ray computed tomography system, an x-ray tomosynthesis system, a C-arm x-ray imaging system, an on-board cone-beam CT imaging system for image-guided radiation therapy, a magnetic resonance imaging system, an ultrasound system, and a positron emission tomography system.

9. A method for reconstructing an image using a medical imaging system, the steps of the method comprising:
   a) acquiring data from a subject with the medical imaging system, the acquired data containing a plurality of data consistency classes;
   b) reconstructing an image of the subject from the data acquired in step a), the image of the subject containing artifacts associated with data inconsistencies;
   c) forming an image matrix having a first column corresponding to the image reconstructed in step b);
   d) computing a target image matrix by iteratively updating the image matrix formed in step c) by minimizing a matrix rank of the image matrix subject to a data consistency condition such that each column of the computed target image matrix corresponds to a different one of the plurality of data consistency classes; and
   e) providing a first column of the target image matrix computed in step d) as an image of the subject that is substantially free of artifacts.

10. The method as recited in claim 9 in which the plurality of data consistency classes in the data acquired in step a) include a data consistency class for data consistent with a true image of the subject and a data consistency class for data consistent with at least one artifact.

11. The method as recited in claim 9 in which the plurality of data consistency classes in the data acquired in step a) include data consistency classes corresponding to data consistent with different physical states of the subject.

12. The method as recited in claim 11 in which the different physical states of the subject include at least one of different cardiac phases and different respiratory phases.

13. The method as recited in claim 9 in which the plurality of data consistency classes in the data acquired in step a) include data consistency classes corresponding to data consistent with different speeds of subject motion that occurred when the data was acquired in step a).

14. The method as recited in claim 9 in which the medical imaging system is at least one of an x-ray computed tomography system, an x-ray tomosynthesis system, a C-arm x-ray imaging system, an on-board cone-beam CT imaging system for image-guided radiation therapy, a magnetic resonance imaging system, an ultrasound system, and a positron emission tomography system.

* * * * *